United States Patent [19]

Herzl

[11] 4,030,355

[45] June 21, 1977

[54] OBSTACLE ASSEMBLY FOR VORTEX TYPE FLOWMETER

[75] Inventor: Peter J. Herzl, Morrisville, Pa.

[73] Assignee: Fischer & Porter Co., Warminster, Pa.

[22] Filed: June 18, 1976

[21] Appl. No.: 697,686

[52] U.S. Cl. .......................................... 73/194 VS
[51] Int. Cl.² .......................................... G01F 1/68
[58] Field of Search ................................ 73/194 VS

[56] References Cited

UNITED STATES PATENTS

| 3,564,915 | 2/1971 | Tomota et al. | 73/194 |
| 3,927,566 | 12/1975 | Zanker | 73/194 |
| 3,948,097 | 4/1976 | Kurita et al. | 73/194 |

Primary Examiner—Herbert Goldstein

[57] ABSTRACT

A flowmeter including a flow tube forming a conduit for the fluid to be measured and an obstacle assembly mounted therein capable of generating strong, stabilized fluidic oscillations which are sensed to produce a signal whose frequency is accurately proportional to the flow rate of the fluid passing through the tube, regardless of fluid turbulence or other disturbing factors. The obstacle assembly is formed by a vortex-shedding front section which is mounted across the flow tube, and a vortex-stabilizing rear section supported behind the front section to define a gap therebetween. The rear section has a central opening therein to permit the passage of fluid therethrough to smooth out turbulence and thereby create an orderly trail of vortices.

7 Claims, 4 Drawing Figures

U.S. Patent  June 21, 1977  4,030,355
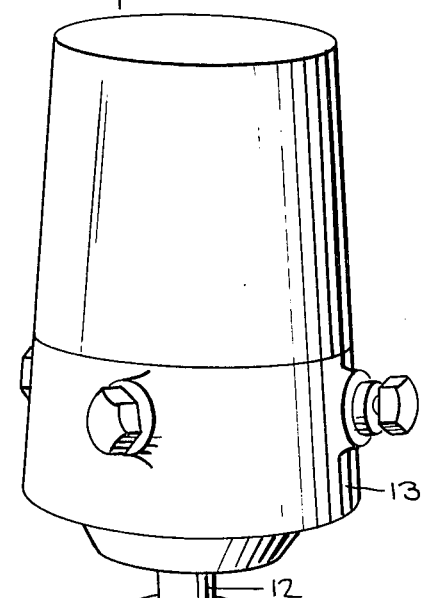
Fig.1.
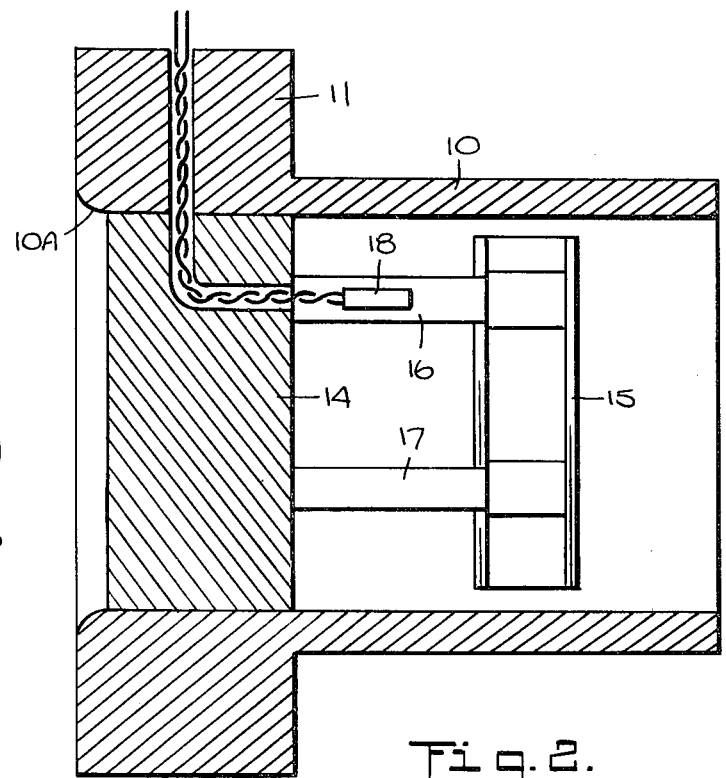
Fig.2.
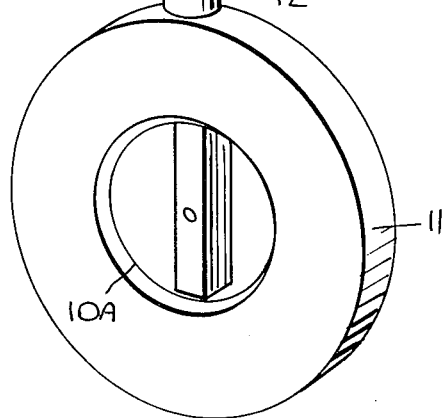
Fig.4.
Fig.3.

OBSTACLE ASSEMBLY FOR VORTEX TYPE FLOWMETER

BACKGROUND OF INVENTION

This invention relates generally to flowmeters of the vortex-shedding type, and more particularly to an obstacle assembly for such flowmeters which is adapted to enlarge the effective operating range of the meter and to improve its accuracy and repeatability.

It is well known that under certain circumstances the presence of an obstacle in a flow conduit will give rise to periodic vortices. For small Reynolds numbers, the downstream wake is laminar in nature, but at increasing Reynolds numbers, regular vortex patterns are formed. These patterns are known as Karman vortex streets. The frequency at which vortices are shed in a Karman vortex street is a function of flow rate. It is this phenomenon which is exploited to create a flowmeter. Flowmeters of this type are disclosed in the Bird patent, U.S. Pat. No. 3,116,639, and in the White patent, U.S. Pat. No. 3,650,152.

In a vortex-shedding flowmeter, the frequency of shedding is precisely related to the velocity of fluid passing through the flow tube containing the shedding body, but only as long as the separation point from which shedding takes place remains fixed and the feedback mechanism causing shedding to transfer from one side of the body to the other remains constant.

In its most elementary form, the shedding body is a simple cylinder mounted across the flow tube. The difficulty experienced with this type of shedding body is that the separation point (i.e., the location at which vortices leave the body) shifts with Reynolds numbers. As a consequence, the vortex trail tends to meander down the flow tube behind the shedding body. If the angle of this vortex trail changes, the feedback mechanism causing shedding to take place from alternate sides of the shedding body also undergoes change, thereby giving rise to deviations from the predicted frequency of the shedder. As a result, meter accuracy and meter repeatability are poor.

Vortex meters are commercially available having shedding bodies which are designed to overcome these drawbacks by optimizing the shedding body width and geometry in relation to the flow tube size. The U.S. Pat. No. 3,572,117 to Rodely discloses a bluff body flowmeter having a prescribed geometric configuration designed to minimize irregularities in the oscillating wake. These meters constitute an improvement over meters having cylindrical shedding bodies. However, under less-than-ideal operating conditions, the vortex wake or trail created by these non-cylindrical shedding bodies will still, on occasion, become intermittent or meander, to produce the same disadvantages encountered with cylindrical bodies.

The Burgess patent, U.S. Pat. No. 3,589,185 discloses an improved form of vortex-type flowmeter wherein the signal derived from the fluid oscillation is relatively strong and stable to afford a favorable signal-to-noise ratio insuring accurate flow-rate information over a fairly broad range. In this meter, an obstacle assembly is mounted in the flow conduit, the assembly being constituted by a block positioned across the conduit with its longitudinal axis at right angles to the direction of fluid flow, a strip being mounted across the conduit behind the block and being spaced therefrom to define a gap which serves to trap Karman vortices and to strengthen and stabilize the vortex street. This street is sensed to produce a signal whose frequency is proportional to flow rate.

In another Burgess patent, U.S. Pat. No. 3,888,120 dealing with a vortex-type flowmeter, there is disclosed an obstacle assembly constituted by a fixed front section contoured to cause flow separation of the incoming fluid stream whose flow rate is to be measured, and a rear non-streamlined section which is shaped to interfere with the vortex street in the wake of the front section and is cantilevered from the front section to define a gap. The rear section is slightly deflectable relative to the front section whereby it is excited into minute vibrations by the vortex street. These vibrations are sensed by a strain gauge to produce a signal proportional to flow rate.

The liquid vortex flowmeter Model 10 LV 1000, manufactured by the Fischer & Porter Company of Warminster, Pennsylvania, the assignee herein, operates in accordance with the principles set forth in Burgess, U.S. Pat. No. 3,888,120. This liquid vortex flowmeter constitutes a commercially successful version of a vortex meter utilizing a two section shedder to create a vortex street. It is an excellent flowmeter whose rate accuracy on low viscosity fluids, such as water, within a broad operating range is about 2%.

However, some flow rate measuring applications require a higher order of accuracy and a still broader operating range. Also, in some applications the fluid being measured is subject to viscosity changes, turbulence and other disturbances which adversely affect the accuracy of the readings obtained with meters of the 10 LV 1000 type.

SUMMARY OF INVENTION

In view of the foregoing, it is the main object of this invention to provide a flowmeter of the vortex type wherein the obstacle assembly mounted within the flow tube is adapted to generate strong, stabilized fluidic oscillations in which the frequency of vortex shedding is accurately related to fluid velocity regardless of turbulence, changes in fluid viscosity and other disturbing factors which in prior art types of vortex flowmeters tend to degrade this relationship.

More particularly, it is an object of this invention to provide a two-section obstacle assembly in which fluid passes through a central opening in the rear section to smooth out turbulence and thereby create an orderly trail of vortices whereby the vortex-type flowmeter which incorporates this obstacle assembly affords highly accurate readings of flow rate throughout a broad operating range.

Also an object of this invention is to provide a vortex-type flowmeter which is reliable and efficient in operation and lends itself to mass-production at relatively low cost.

Briefly stated, these objects are attained in a flowmeter provided with a flow tube forming a conduit for the fluid to be metered and an obstacle assembly mounted therein to produce an orderly trail of vortices regardless of turbulence and other disturbing factors. Sensing means are associated with the obstacle assembly to produce an output signal whose frequency is proportional to the flow rate of the fluid through a broad operating range.

The obstacle assembly is constituted by a front section that is mounted across the flow tube with its longitudinal axis at right angles to the flow axis and a rear section supported behind the front section to define a gap therebetween. The rear section having a central opening therein to provide a fluid passage creating an orderly trail of vortices.

OUTLINE OF DRAWING

For a better understanding of the invention as well as other objects and further features thereof, reference is made to the following detailed description to be read in conjunction with the accompanying drawings, wherein:

FIG. 1 is a perspective view of a vortex-type flowmeter which incorporates a first embodiment of an obstacle assembly in accordance with the invention;

FIG. 2 is a section taken through the obstacle assembly shown in FIG. 1;

FIG. 3 is a perspective of the obstacle assembly; and

FIG. 4 illustrates in perspective a second embodiment of an obstacle assembly in accordance with the invention.

DESCRIPTION OF INVENTION

First Embodiment

Referring now to the drawings and more particularly to FIGS. 1 to 3, there is shown a vortex-shedding flowmeter which incorporates a first embodiment of an obstacle assembly in accordance with the invention, the meter including a flow tube 10 through which is conducted the fluid whose flow rate is to be measured. Tube 10 is provided at its inlet side with a flange 11 of enlarged outer diameter. The inlet 10A of the flow tube is chamfered to provide a smooth flow transition from the upstream pipe. Mounted vertically on flange 11 by a stub pipe 12 is a signal conditioner housing 13, the signal conditioner being coupled through the stub pipe to the sensor within the flowmeter.

This flowmeter is installed in the manner disclosed in greater detail in a copending application of Burgess Ser. No. 493,855, filed Aug. 1, 1974, by interposing it in a flow line constituted by an upstream pipe section and a downstream pipe section. The two pipe sections have complementary mounting flanges and a circular series of bores therein to accommodate bolts.

The meter is installed by telescoping flow tube 10 into the downstream pipe section and then clamping meter flange 11 between the upstream and downstream mounting flanges by means of the bolts intercoupling the pipe flanges which form a cage encircling and abutting the periphery of the meter flange and acting to center the flow tube within the downstream pipe section. Gaskets are sandwiched between the meter flange and the pipe flange to prevent fluid leakage.

Vertically mounted within flow tube 10 is an obstacle assembly formed by a front section 14 and a rear section 15 cantilevered from the front section by upper and lower beams 16 and 17. Front section 14 is a contoured block having a delta-shaped cross-section which is uniform throughout the longitudinal axis of the block, this axis being perpendicular to the flow axis of the flow tube.

The extremities of front section 14 are attached to the wall of flow tube flange 11, whereby the front section is fixedly held within the flow tube, whereas the cantilevered rear section 15 of the obstacle assembly is deflectable. The space between the front and rear sections defines a gap which, as explained in Burgess, U.S. Pat. No. 3,589,185, acts to trap Karman vortices and to strengthen and stabilize the vortex street.

As illustrated in FIG. 3, the apex of front section 14 faces the incoming fluid, the inclined sides thereof forming leading edges which are swept by the flow of fluid and divide the stream to create a series of vortices that alternate with respect to the center line of the front section. As the vortices detach themselves from the front section, alternate areas of low pressure are created that shift from side to side, producing an oscillating thrust behind the front section and causing the deflectable rear section which is suspended by beams 16 and 17 to swing periodically at a frequency that is proportional to the incoming fluid velocity.

The periodic swing is sensed by a strain gauge sensor 18 mounted on the upper beam 16. Leads L to the sensor may be connected to external terminals in signal conditioner 13 through an internal passage in front section 14.

Rear section 15, as best seen in FIG. 3, is constituted by two parallel channel-shaped pieces $P_1$ and $P_2$ which face each other and are joined together by cross bars 19 and 19'. Beams 16 and 17 are secured to the midpoint of these bars. The space between pieces $P_1$ and $P_2$ provides a central opening which permits the flow therethrough of fluid and acts to smooth out turbulence behind the front section which is sufficient to create an orderly vortex trail straight down the center of flow tube 10. This central passage significantly improves the accuracy and repeatability of the flowmeter.

Second Embodiment

The obstacle assembly illustrated in FIG. 4 acts in essentially the same manner; but in this instance, rear section 20 of the assembly is one solid piece and is provided with a row of bores 21 in the central zone of the piece to provide the required central passage to smooth out turbulence and thereby improve the operating characteristics of the meter.

The invention is not limited to any one form of two-section vortex meter. The obstacle assembly may be of the deflectable rear section type as disclosed in Burgess U.S. Pat. No. 3,888,120, in which case a vibration sensor is required to detect the vibratory motion to produce an output signal whose frequency is proportional to flow rate. Or it may be of the fixed rear section type disclosed in Burgess U.S. Pat. No. 3,589,185, in which case the fluidic oscillations are sensed by a heated thermistor, a force sensor or any other type of sensor appropriate to this form of meter. Also, the front section need not be in a delta configuration but may be triangular in shape, rectangular or in any other form suitable for producing an effective shedding action.

While there have been shown and described preferred embodiments of an improved obstacle assembly in accordance with the invention, it will be appreciated that many changes and modifications may be made therein without, however, departing from the essential spirit thereof.

I claim:

1. A vortex type flowmeter providing accurate flow rate readings regardless of turbulence or other disturbances in the fluid being metered, said flowmeter comprising:
   A. a flow tube forming a conduit for the fluid to be metered;
   B. an obstacle assembly disposed in said tube and constituted by a front section and a rear section, said front section being mounted across said tube at right angles to the longitudinal flow axis of said tube to intercept the incoming fluid whereby fluidic vortices are periodically shed therefrom, said rear section being disposed at right angles to said flow axis and being spaced from said front section to define a gap therebetween to trap and to stabilize said vortices, said rear section having an opening in the central zone thereof through which said flow axis extends to permit the passage of fluid therethrough in a direction parallel to said flow axis to smooth out turbulence behind the front section to an extent creating an orderly vortex trail down the center of the flow tube; and C. means to sense the fluidic vortices to produce an output signal whose frequency corresponds to the periodicity of the vortices and is proportional to the flow rate of the fluid being metered.

2. A flowmeter as set forth in claim 1, wherein said rear section is formed by a pair of spaced pieces which are joined together, the spacing between the pieces forming said opening.

3. A flowmeter as set forth in claim 2, wherein said pieces are defined by channel members.

4. A flowmeter as set forth in claim 1, wherein said rear section is cantilevered from said front section by a flexible beam whereby said rear section is caused by said vortices to vibrate at the same rate, and said sensing means is constituted by a vibration-responsive detector mounted on said beam.

5. A flowmeter as set forth in claim 1, wherein said front section has a delta-shaped cross-section.

6. A flowmeter as set forth in claim 1, wherein said sensing means is a force sensor disposed within said tube.

7. A flowmeter as set forth in claim 1, wherein said rear section is a solid body provided with holes therein to define said opening.

* * * * *